Figure 1:
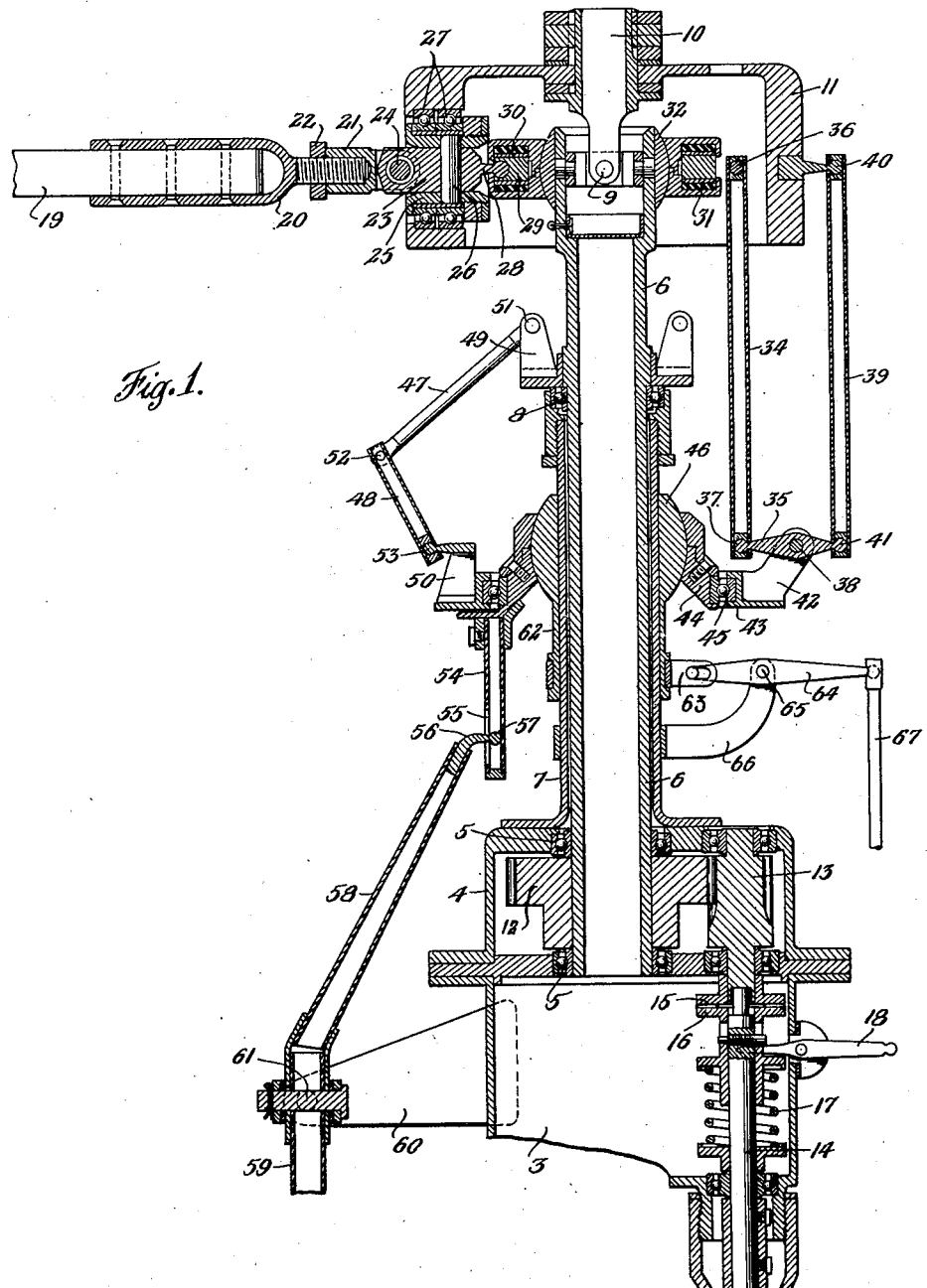

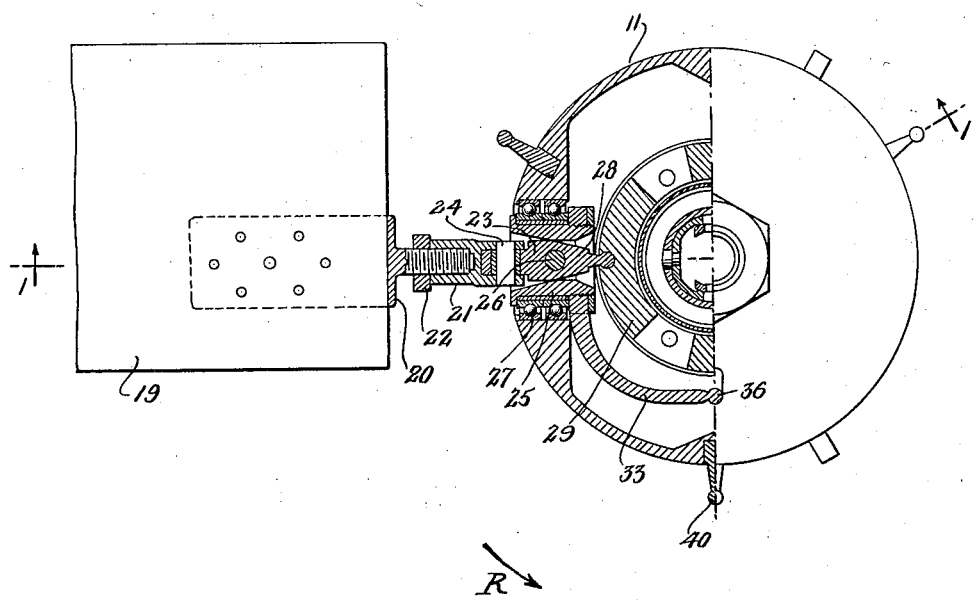

Patented May 26, 1953

2,639,776

UNITED STATES PATENT OFFICE 2,639,776

AIRCRAFT ROTOR WITH TILTING HUB AND DAMPER CONTROL OF BLADE SWINGING

Paul H. Stanley, Glenside, Pa., assignor to Autogiro Company of America, Philadelphia, Pa., a corporation of Delaware Original application May 14, 1942, Serial No. 442,911, now Patent No. 2,444,070, dated June 29, 1948. Divided and this application April 1, 1948, Serial No. 18,383

13 Claims. (Cl. 170—160.55)

This invention relates to rotative winged aircraft, and is particularly concerned with a novel form of aircraft rotor with tilting hub and control of blade swinging, which is especially adapted to serve as a sustaining rotor. The present application is a division of my copending application Serial No. 442,911, filed May 14, 1942, which issued June 29, 1948, as Patent No. 2,444,070.

Aircraft sustaining rotors commonly incorporate a hub and a plurality of blades connected with the hub by means of one or more pivots including, at least, a flapping pivot. During operation of such aircraft, the rotor moves through the air more or less edgewise, the translational flight movement being set up either by the employment of a separate propulsive airscrew or by tilting the axis of the rotor. In either event, and whether the rotor is operating autorotationally or is being power driven, the blades experience a wide variation in the direction and velocity of local airflow over the surfaces thereof, the blade advancing in the direction of translational flight being subject to airflow of much higher velocity than the blade which is retreating with respect to the flight direction.

Conditions such as those mentioned above set up periodic fluctuations in effective aerodynamic angle of attack, which fluctuations are of considerable magnitude. As is known in this art, such fluctuations are accompanied by fluctuations in lift and drag forces on the blades, which forces, in turn, are among the forces causing blade swinging relative to the hub and also as between blades.

Undesirably extensive variations in angle of attack occur at times during maneuvering of the aircraft, and especially during sharp maneuvers. Moreover, these conditions are particularly noticeable in helicopter type aircraft, wherein the range of flight speeds may vary all the way from true hovering to relatively high speed translational flight, and wherein the rotor may at times be horizontal (as in hovering) or inclined downwardly and forwardly (as in translational flight). It has been found, in fact, that the effect of air disturbances or sharp maneuvering in an aircraft having a power driven rotor introduces variations in effective aerodynamic angle of attack of such magnitude as to exceed safe limits. For instance, under certain conditions, the effective angle of attack at one side of the rotor has been increased momentarily beyond the stalling point, which of course introduces severe tendencies toward relative blade swinging, especially in the lag-lead sense.

Another known source of extensive movement of the blades (viewed in plan) is the change of torque arising from application or cessation of driving or braking action on the rotor; but in such case the blades tend for the most part to lag or lead in unison, relatively to the hub, rather than irregularly, relatively to the hub and to each other.

It has heretofore been known to provide restraints or controls (for example by damping devices) resistive to swinging of the blades relative to the hub and/or relative to each other; and it is an object of the present invention to improve the restraint upon blade swinging, particularly while accommodating the desired hub tilting motions and blade pitch variations provided by the mechanism disclosed and claimed in my aforesaid parent application.

The arrangement of the invention, in its preferred embodiment, automatically introduces a frictional restraint or damping of the blades when they move relatively to each other, while leaving them substantially free for identical lag motions or identical lead motions, and this regardless of blade motion in the pitch change sense or of hub motion in the tilting sense.

More specifically, the invention contemplates a blade-swinging damper assembly so associated with a universally tiltable rotor hub and/or with one or more parts of the hub mounting and driving mechanism and the blade root mountings, that said damping assembly does not appreciably interfere with the hub tilting or with identical swinging movements of a plurality of blades, and preferably in such wise that the damping assembly tilts with the hub about a center concentric with the hub tilting center and is rotatable about the hub axis when the blades lag or lead identically relatively to the hub.

Other novel structural features are employed in association with the blade mounting and the hub mounting, as will further appear.

How the foregoing and other objects and advantages are attained will appear more clearly from the following description, referring to the accompanying drawings, in which—

Figure 1 is a vertical sectional view of a rotor hub and mount, the view being taken substantially as indicated by the section line 1—1 on Figure 2; and Figure 2 is a plan view, partly in horizontal section and partly in elevation, illustrating portions of the hub shown in Figure 1.

The rotor hub may be mounted on fixed structure 3. A support 4 is carried on this structure, and within the support a pair of bearings 5—5 cooperates with the rotative hub spindle 6. A non-rotative sleeve 7 is secured to and extends upwardly from the support 4, a bearing 8 being operatively interposed between the upper end of this sleeve and the rotative spindle 6.

At a point spaced appreciably above the upper end of the sleeve 7, the spindle 6 is provided with a universal joint 9, this joint serving to carry the spindle extension 10 to which the bell shaped rotative hub 11 is connected. The joint may desirably be of the constant velocity type so as to enhance smoothness of torque transmission to the hub regardless of the tilted position of the hub on the universal joint.

The spindle 6, and thus the hub, may be driven by means of a gear 12 meshing with a pinion 13 which, in turn, is adapted to be driven from the power shaft 14, the latter being connected with any suitable prime mover in the body of the machine. If the aircraft is of the purely autorotative winged type, shaft 14 would ordinarily be coupled with the engine employed to drive the usual propulsive airscrew. In that type of helicopter in which no propulsive airscrew is employed, the engine would ordinarily be provided chiefly, if not solely, for rotor driving purposes.

In any event, it is contemplated that suitable overrunning and manually controllable clutches should be incorporated in the drive transmission, so that the rotor may rotate freely, at least for the purpose of descent without power, with the blades set at an autorotative angle of attack.

In Figure 1, there is illustrated a dog type clutch for interconnecting pinion 13 and shaft 14, this clutch including toothed parts 15 and 16, the latter of which is urged upwardly by a spring 17 so as to normally maintain engagement. With this arrangement, however, upon failure of the engine, the rotor may freely overrun the drive, the spring 17 yielding as the dog teeth pass each other. This same mechanism may be employed for manual disconnection of the drive, as by a lever 18, by means of which the lower dog 16 may be held in lowered position, against the pressure of spring 17.

As herein disclosed, it is contemplated that the rotor shall incorporate three blades, and it may be mentioned that, in accordance with the invention of my copending parent application, the rotor preferably incorporates at least three blades, this being of importance for reasons which will further appear. The inner end of one such blade appears at 19, this blade having a root end mounting member 20 the inner end of which is threaded into a block 21, being secured by a nut 22. Block 21 is forked to receive link 23, the link and block being interconnected by a flapping pivot 24, providing freedom for blade swinging movement in a direction generally transverse the mean rotative path of travel of the blades.

Link 23 projects into a sleeve 25, the sleeve and link being interconnected by a drag pivot 26, providing freedom for lag-lead movement of the blade.

Sleeve 25 is journaled in the hub 11 by means of bearings 27, the axis of which is preferably coincident with the longitudinal axis of the blade, thereby providing for pitch change movement of the blade.

The lag-lead movement of the several blades is controlled, according to the present invention, by means of a damper device arranged within and concentrically of the hub, each blade having an inwardly projecting arm 28 cooperating with a ring segment 29 (see Figure 2). The ends of the several segments 29 are spaced from each other, and above and below the segments, friction discs 30 are backed by rubber rings 31, so as to restrain movement of the segment about the axis of the hub. Thereby, movements of the blades in the lag-lead sense are damped or restrained.

Since the hub is free to float about the center point of universal joint 9, the damper device described just above is also mounted for similar floating movement, a spherical seat 32 being provided for this purpose. Preferably, the damper device is free to rotate with respect to hub spindle 6, the effect of which is to permit unrestrained simultaneous lag-lead movement of all of the blades in the same sense. Relative lag-lead movement of the blades (for instance, one forwardly and another rearwardly) is, however, restrained by the action of the damper device. The mounting, incorporating seat 32, also serves as a centering device for the damping mechanism and to take certain reactions occurring during its operation in restraint of blade swinging.

For the purpose of controlling the pitch angle thereof, each blade is provided with a control arm 33 which is rigidly connected with the sleeve 25 and may, therefore, be used to cause the blade to move about its own longitudinal axis (the axis defined by bearings 27). As seen in Figure 2, the control arm 33 extends forwardly of the blade with reference to the direction of rotation of the rotor (indicated by arrow R), the extension of the arm preferably being to a point approximately 90° in advance of the blade. A vertical link 34 (see Figure 1) interconnects control arm 33 and one end of a lever 35, ball and socket joints 36 and 37 being provided at the upper and lower ends of link 34. Lever 35 is pivoted intermediate its ends, as indicated at 38, the other end of the lever being connected by means of a link 39 with the hub member 11, ball and socket joints 40 and 41 again being provided in this link connection.

Lever 35 is mounted on a bracket 42 projecting from rotative ring 43, it being understood that the linkage parts above described (33 to 42 inclusive) are duplicated for each blade. Ring 43, in turn, is mounted on swash member 44 by means of a bearing 45, the swash member being tiltable in all directions on the ball 46.

Ring 43 is constrained to rotate with the rotor by a "scissors" linkage including link parts 47 and 48. The upper member 47 of the scissors linkage is pivoted to a bracket 49 carried by and rotating with the spindle 6. The lower end of link 48 is connected with a bracket 50 carried by ring 43. The joints 51, 52 and 53 in this linkage are such as to constrain the ring 43 to rotate with the rotor and yet to permit freedom for tilting movement of ring 43 about the center of ball 46, and also to permit vertical movement of ring 43 by means of certain control connections referred to herebelow. For this purpose, a single pivot pin may be used for joint 51 and also for joint 52, although joint 53 preferably comprises a universal or ball joint, the center of which is desirably located in the same plane as the center of ball 46 about which ring 43 is tiltable.

Tilting movement of swash member 44 may be effected through the depending control tube 54, which is slotted as at 55 in order to permit free relative vertical movement of tube 54 and the cooperating actuating part 56, which latter is provided with a ball 57 interiorly of the tube. The operating part 56 projects from the upper end of control arm 58, constituting an extension of the manually operable control member 59 which is carried on a fixed bracket 60 by means of a universal joint 61. The manual control 59 may, therefore, be swung in any direction, and through the arm 58 and parts 54 to 57, these swinging movements may be employed to tilt the swash member 44, likewise in any direction.

The ball 46, which constitutes the seat for swash member 44, has a downwardly extending sleeve 62 carrying an apertured lug 63 by which the ball 46 and thus the swash member, ring 43 and associated parts may be moved vertically. A control for this purpose includes a lever 64 pivoted at 65 to a fixed bracket 66, the free end of this lever cooperating with a manual control, such as the push-pull tube 67.

In considering the operation of the foregoing mechanism, it is first to be observed that the hub 11, and thus the entire rotor, is free to tilt in any direction about the center point of the universal joint 9. The hub and the rotor blades are, therefore, free floating and may take up different planes of rotation, depending upon the forces acting upon the blades. Normally, the blades assume an average position defining a very flat cone, the flapping pivots 24 providing the necessary freedom for the blades to move to this position. The axis of the cone may, of course, be inclined in one direction or another depending upon the conditions under which the machine is operating and, because of the universal mounting of the hub, the axis of the hub will always approximately coincide with the axis of said cone.

Pitch change movements of the blades may take place in three different ways, with the mechanism as above described. Two of these ways are manually controllable and the third is automatic, although it may here be noted that the action of each pitch variation is independent of the other, in the sense that they may take place independently at different times, or at the same time, in which latter case the several effects are superimposed upon each other.

In analyzing the three types of pitch change, reference is first made to the automatic pitch variation. Assume that the control ring 43 is maintained in a horizontal plane, as shown in Figure 1. In this condition, tilting of the hub 11 about the universal 9 will introduce changes of blade pitch angle. For instance, if the hub tilts downwardly at a point 90° in advance of blade 19, as shown in Figure 2, the link 39, which is attached to the hub by joint 40, will similarly be caused to move downwardly, thereby rocking arm 35 and causing link 34 to move upwardly, this latter link being connected with arm 33 by joint 36. It will be seen that tilting movement of the hub in the sense just mentioned causes an increase of the pitch angle of blade 19 (Figure 2). Thus, tilting movement of the hub in one plane causes a change in the effective aerodynamic angle of attack of the blades as they pass through an azimuth generally at right angles to the plane of hub tilting.

Turning now to the manual controls, it is first mentioned that the control 67, by means of which the swash member 44 may be moved upwardly or downwardly, provides for simultaneous increase and decrease of the mean pitch of all blades of the rotor. This takes place by virtue of raising and lowering the pivotal mounting 38 for the several levers 35. When these pivot points (38) are raised the pitch of all blades is increased, and when lowered the pitch is decreased. Thus, the control 67 may be used to alter the operating conditions of the machine. For example, assuming a helicopter normally having its rotor power driven with the blade angle relatively high, if it is desired to descend without power, the blade angle may be reduced to an appropriate autorotative value.

The control 59, by means of which the swash member 44 may be tilted, is provided primarily for maneuvering purposes. This control operates to raise the pivot point 38 at one side of the rotor and to lower said point at the opposite side, depending upon the direction in which the control 59 is displaced. The effect of differentially raising and lowering opposite pivot points 38 is to introduce periodic differential pitch change of the blades, thereby shifting the lift line of the rotor which, in turn, introduces controlling moments in the lateral and longitudinal directions. The control hook-up is preferably such that "instinctive" control is provided of the general character more fully disclosed in the patent of Juan de la Cierva No. 2,380,582 (corresponding to British Patent No. 410,532).

Both of the manual controls referred to just above operate substantially independently of the automatic control although, as above pointed out, all three controls may operate simultaneously, in which event their action is superimposed.

It will now be apparent that, in its preferred embodiment the damping mechanism of the present invention accommodates all of the above control operations, likewise the blade flapping motions, the hub tilting motions, and identical blade leading or lagging motions, while giving the desired restraint upon non-uniform or differential blade swinging. In the embodiment shown, these results are accomplished by the arrangement of the damping assembly whereby it is free to "float," so to speak, in accordance with the requirements imposed by the hub and other parts of the rotor assembly.

I claim:

1. In an aircraft rotor having a plurality of blades, a central mounting assembly constructed to provide for universal tilting of the axis of rotation of the blades as a group, pivotal means constructed to provide for swinging of said blades in a given sense with respect to said mounting either in unison or relative to each other, and restraining mechanism coupled for interaction between said blades whereby to restrain relative swinging, without appreciable restraint of said universal tilting, and means operatively associated with said restraining mechanism to provide substantially free swinging movement of the blades in unison.

2. A construction according to claim 1 wherein the last-mentioned means comprises a centering device for said restraining mechanism.

3. A construction according to claim 1, wherein the means providing for swinging of the blades comprise drag pivots on which blade motion in the plane of lag-and-lead may occur, and the restraint mechanism acts in said plane.

4. The construction of claim 1, wherein the restraint mechanism is mounted to move on the same center as the center of tilt of said axis of rotation.

5. The construction of claim 1, wherein the restraint mechanism has a rotatable mounting relative to said central mounting assembly.

6. In an aircraft rotor having a plurality of blades, a common mounting constructed to provide for universal shifting of the axis of rotation of the blades as a group, pivotal means constructed to provide for swinging of said blades in a given sense with respect to said mounting either in unison or relative to each other, and restraining mechanism coupled for interaction between said blades whereby to restrain relative swinging, and means operatively associated with said restraining mechanism to provide for substantially free swinging movement of the blades in unison including a mounting by which such restraining mechanism is universally shiftable with said axis of rotation.

7. For an aircraft, a sustaining rotor comprising a rotative hub, a plurality of blades, each pivotally connected with the hub on an axis providing freedom for swinging movement of the blade in the lag-lead sense about an axis offset from the rotor axis, a blade movement control device disposed within the hub and adapted to control said swinging movements, and, for each blade, a connection associated with said device, said connection projecting radially inwardly of the lag-lead pivot for that blade and being so coupled to said blade and said device as to thereby exert control on said lag-lead movements.

8. A construction in accordance with claim 7 in which the hub is mounted for free tilting movement in all direction about a point lying on the rotational axis of the hub, and in which said blade movement control device is also tiltable about said point.

9. In an aircraft sustaining rotor having a rotative hub and a plurality of blades radiating therefrom, a blade-mounting assembly for each blade comprising a hollow pitch pivot member secured in the hub, a blade pivot secured to said member and providing a blade swinging axis substantially intersecting the longitudinal blade axis, and means for controlling blade swinging including a control connection connected with the blade and extending into the hub through said hollow pivot member.

10. In an aircraft sustaining rotor having a rotative hub and a plurality of blades radiating therefrom, a blade-mounting assembly for each blade comprising a hollow pitch pivot member secured in the hub, a blade pivot secured to said member and providing a blade swinging axis substantially intersecting the longitudinal blade axis, a pitch control arm coupled to said hollow pivot member and extending generally peripherally of the hub, and means for controlling blade swinging including a control connection connected with the blade and extending into the hub through said hollow pivot member.

11. A construction according to claim 10, wherein said means for controlling blade swinging includes a control device located within the hub and coupled to said control connection, and said pitch control arm lies between the hub wall and said device.

12. In an aircraft sustaining rotor, a rotative hub and a plurality of blades, whereof each blade is connected with said hub by a plurality of pivot mountings, one of said mountings comprising a hollow journal arranged with its axis generally coincident with the longitudinal axis of the blade and turning with the blade in the pitching sense, and said mountings further including a pivot intersecting the blade axis and operatively interposed between said journal and the blade and having its pivot axis offset from the rotor axis, together with a member for controlling blade swinging on the latter pivot, said member extending into the interior of the hub through the center of said journal and therein having means of connection with an element for controlling blade swinging.

13. A construction in accordance with claim 12 wherein said pivot is arranged to accommodate swinging of the blade in a lag-lead sense and a flapping pivot is operatively interposed between said lag-lead pivot and the blade.

PAUL H. STANLEY.

References Cited in the file of this patent

UNITED STATES PATENTS

| Number | Name | Date |
|---|---|---|
| 2,122,450 | Campbell | July 5, 1938 |
| 2,155,427 | Larsen | Apr. 25, 1939 |
| 2,261,337 | Campbell | Nov. 4, 1941 |
| 2,311,247 | Pitcairn | Feb. 16, 1943 |